US007120691B2

(12) United States Patent
Goodman et al.

(10) Patent No.: US 7,120,691 B2
(45) Date of Patent: Oct. 10, 2006

(54) SECURED AND ACCESS CONTROLLED PEER-TO-PEER RESOURCE SHARING METHOD AND APPARATUS

(75) Inventors: Brian D. Goodman, Roxbury, CT (US); John W. Rooney, New Fairfield, CT (US); Ramesh Subramanian, Woodbury, CT (US); William C. Sweeney, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 10/098,976

(22) Filed: Mar. 15, 2002

(65) Prior Publication Data
US 2003/0177186 A1  Sep. 18, 2003

(51) Int. Cl.
G06F 15/173 (2006.01)
(52) U.S. Cl. ............ 709/225; 709/223; 709/229; 713/201
(58) Field of Classification Search ............... 709/217, 709/223–225, 205, 229, 203; 713/176, 201
See application file for complete search history.

(56) References Cited

U.S. PATENT DOCUMENTS

| 5,469,575 | A | 11/1995 | Madduri |
| 5,553,240 | A | 9/1996 | Madduri |
| 5,944,783 | A | 8/1999 | Nieten |
| 5,960,404 | A | 9/1999 | Chaar et al. |
| 6,016,316 | A | 1/2000 | Moura et al. |
| 6,041,343 | A | 3/2000 | Nguyen et al. |
| 6,098,091 | A | 8/2000 | Kisor |
| 6,216,162 | B1 | 4/2001 | Dutcher et al. |
| 2002/0116533 | A1* | 8/2002 | Holliman et al. ........... 709/246 |
| 2002/0156875 | A1* | 10/2002 | Pabla ........................ 709/220 |
| 2002/0184357 | A1* | 12/2002 | Traversat et al. ........... 709/223 |
| 2003/0018712 | A1* | 1/2003 | Harrow et al. .............. 709/203 |
| 2003/0163702 | A1* | 8/2003 | Vigue et al. ................ 713/176 |

FOREIGN PATENT DOCUMENTS

| JP | 10187643 A | 7/1998 |
| JP | 10229418 A | 7/1998 |

OTHER PUBLICATIONS

Kim et al, "A Secure Platform for Peer-to-Peer Computing in the Internet", IEEE, Jan. 7-10, 2002.*
"The Emergence of Distributed Content Management and Peer-to-Peer Content Networks", Gartner Consulting, Jan. 2001.

* cited by examiner

Primary Examiner—Philip B. Tran
(74) Attorney, Agent, or Firm—Stephen Bongini; Fleit, Kain, Gibbons, Gutman, Bongini & Bianco P.L.

(57) ABSTRACT

A peer-to-peer network propagates searches from client to client. Resources within each client are selectively searched in response to authentication and authorization processes. Authentication information may be included in a search request or may be performed by an authentication process external to the client. Authorization is performed by a process external to the client. Only after authentication or authorization may resources of any particular client be accessed. The system allows for secure propagated searches and resource access in a peer-to-peer network environment. The network may further include a server for maintaining a list of clients connected to the peer-to-peer network in order to more efficiently facilitate peer-to-peer communications.

11 Claims, 9 Drawing Sheets

SECURED AND ACCESS CONTROLLED PEER-TO-PEER RESOURCE SHARING METHOD AND APPARATUS

CROSS REFERENCE TO RELATED APPLICATION

This application is related to the inventors' application "CENTRALLY ENHANCED PEER-TO-PEER RESOURCE SHARING METHOD AND APPARATUS," Ser. No. 10/099,366, which was filed on the same day as the present application and commonly assigned herewith to International Business Machines Corporation.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the Unites States Patent and Trademark Office patent file or records, but otherwise reserves all copyright rights whatsoever.

FIELD OF THE INVENTION

This invention is related to the field of peer-to-peer networks.

BACKGROUND OF THE INVENTION

Until recently, corporate data and content within global or other large organizations were distributed by replicating and distributing such data and content using centralized content repositories. That is, the data was globally distributed, but made available within a location of geographical area by using a central server that was responsible for serving the content to clients located within the specified area.

The advent of peer-to-peer (P2P) computing has changed this approach. The accent has shifted from storing content in, and serving from, centralized servers to storing and serving at least some of the content from the client-side. In this P2P model, the content provider manages the content in a local client, and shares the content with anyone who accesses the content. In this model, content creation, storage and security dwells on the client side.

There are several advantages to this P2P approach. By shifting the responsibility for content to the client side, server-side management of diverse resources can be vastly reduced. Server managers need not be responsible for the integrity of the content. Problems arising from centralized distribution of content could be averted.

There are at least three architectural approaches to peer-to-peer resource sharing systems. P2P with centralized control, pure P2P with no centralized control and a hybrid approach that incorporates some of the aspects of the other two.

One example of P2P with a centralized controller is a system referred to as Napster. The Napster system uses a central server to maintain a list of connected clients. Every client connects to the central server, which scans the clients' disks for shared resources and maintains directories and indexes of the shared resources. A client searching for a resource performs the search on the maintained directories and indexes of the central server. Once a client knows where to find the resources that is it seeking (i.e. which client has the files it is searching for), it makes a direct connection to the appropriate client and transfers the resources.

Napster is not web-based, and does not run in a browser. It is a stand-alone application that runs on each individual client, and uses TCP/IP for its data-communication and data transfers. Since Napster depends on a central server that acts as a collector and regulator of information, the clients are not guaranteed anonymity. The Napster system is also vulnerable if the central server fails.

A good example of pure P2P with no centralized control is a system referred to as Gnutella. Gnutella is a generic term used to identify those P2P systems that use the Gnutella protocol. There is no single interpretation of what the protocol is, actually. However, there are certain common elements that manifest in Gnutella-based systems. Chief among those is that Gnutella does away with the central server. In this system, each client continuously keeps track of other clients by pinging known clients in the system. Distributed searches are propagated from one client to its immediate neighbors in ever-increasing circles until answers are found, or the search times out. Search responses are propagated back to the searcher in the same manner.

Like Napster, Gnutella-based systems are also not web-based, and run as applications in client environments. Gnutella is a truly anonymous resource sharing system. No server is used to facilitate searches, clients must establish ad-hock peer information. The searcher does not know the identity of the responder, and vice-versa. Thus there are no authentication or authorization checks, trust is implicitly assumed.

A serious problem in Gnutella-based systems is their reputation for being unreliable. Lacking a central server that keeps track of which client is connected, and which is not, there is no way for a client to know if all its neighbors are alive and connected. This leads to less than reliable performance.

The third approach to P2P systems is referred to as Web Mk. This is more of an approach than an actual product, and is described in a Gartner Report on the emergence of P2P computing entitled The Emergence of Distributed Content Management and Peer-to-Peer Content Networks, January 2001. Said report is hereby incorporated by reference. This is a web-based approach that uses web servers and web browsers. The web browsers would be configurable by users and would integrate resource-sharing features. The servers will maintain multiple indexes and allow access to different forms of data. This type of system would use software agents or Bots to provide services such as extraction and consolidation of multiple resources, chat facilities, and notifications of changes. Search requests could be stored in the server and set to run in real-time or as a batch process, and alert the appropriate clients of the results.

What is needed is a system that adapts the advantages of the P2P network while resolving disadvantages of current P2P systems. What is needed is a P2P network that takes advantage of the reduced central server requirements of a pure P2P network without sacrificing the efficiencies of the central server. What is further needed is a P2P network that provides secure access and control to client resources without the requirement of a central server.

BRIEF SUMMARY OF THE INVENTION

One preferred embodiment of the invention provides a method in a peer-to-peer network for securely conducting a resource search initiated by a first client, the resource search included with a search request having a credentials signal indicative of the first client. The method comprising the steps of communicating the search request from the first client to a second client, communicating the search request from the second client to a third client, the third client having a multiplicity of third resources, each of the multiplicity of third resources having at least one corresponding access attribute; and at the third client, selectively searching the multiplicity of third resources in response to comparison of the credentials signal and the at least one access attribute of each of the multiplicity of third resources.

Another embodiment of the invention provides a client included in a peer-to-peer network having a multiplicity of clients. The client comprises a peer-to-peer network dispatcher for receiving a resource search request from a second client of the multiplicity of clients, the search request initiating from an initiating client of the multiplicity of clients, the search request including a credentials signal having an identification signal indicative of the initiating client. The client also comprises a memory for storing a plurality of resources, each of the plurality of resources having at least one corresponding access attribute and a search engine for selectively searching at least one of the plurality of resources in response to a comparison of the credentials signal and the at least one access attribute of each of the plurality of resources.

Another embodiment of the invention provides a method in a peer-to-peer network a for securely conducting a resource search initiated by a first client, the resource search included with a search request having a credentials signal indicative of the first client. The method comprises the step of communicating the search request from the first client to a second client, the second client having a multiplicity of second resources, each of the multiplicity of second resources having at least one corresponding access attribute. The method further comprises the step of at the second client, selectively searching the multiplicity of second resources in response to comparison of the credentials signal and the at least one access attribute of each of the multiplicity of second resources. The method further comprises the step of communicating the search request from the second client to a third client, the third client having a multiplicity of third resources, each of the multiplicity of third resources having at least one corresponding access attribute. The method further comprises the step of at the third client, selectively searching the multiplicity of third resources in response to comparison of the credentials signal and the at least one access attribute of each of the multiplicity of third resources.

DETAILED DESCRIPTION OF THE INVENTION

It is important to note, that these embodiments are only examples of the many advantageous uses of the innovative teachings herein. In general, statements made in the specification of the present application do not necessarily limit any of the equivalent and various claimed inventions. Moreover, some statements may apply to some inventive features but not to others. In general, unless otherwise indicated, singular elements may be in the plural and visa versa with no loss of generality.

The preferred embodiment is directed towards peer-to-peer (P2P) resource sharing within a corporate intranet environment. The preferred embodiment is a hybrid system for P2P resource sharing. It consists of both a server and a client component. It supports the features of the three aforementioned P2P architectures, as well as some additional characteristics.

The client is an application running in the client computer, and acts as a modified pure P2P client. The system includes reliable IP repository, security integration through enterprise systems, an enhanced client side database for better search results and some basic network activity reduction. Together these qualities provide P2P services for the corporate environment.

Characteristics of the Preferred Embodiment Include:

Reliable IP Repository—Each client first "announces itself" to the server, and requests a list of IP addresses of connected clients. The server sends a seed list of the connected clients. (The term seed list is used because each client needs to know only a limited number of other connected clients). The server maintains a current list of connected clients by maintaining a list of clients, and pinging each client periodically.

Authentication and authorization—Metadata associated with each resource includes file descriptions as well as security and access control information. The security checks can be local account based or enterprise level security based.

Enhanced client database—Each client maintains a database of resources that it shares. The database will preferably not only contain names and characteristics of the files, but also user-defined metadata describing the files.

Reduced Network Activity—Unlike a pure P2P network, clients need not ping the other clients continuously. Instead, a client maintains awareness of other connected clients by downloading the list of IP addresses from the server periodically. Each client sends a handshake to each of the clients in the list received. If an acknowledgement is received from another client, that client is added to the original client's list.

Pure P2P Protocol Based—Like most of the packet communications, search and search response is accomplished among clients using a protocol similar to a pure P2P protocol.

This approach enables use of the central server concept within a P2P environment that results in a highly enhanced P2P resource sharing system. This system thus builds upon existing P2P approaches and provides additional functionality.

Figure 1:
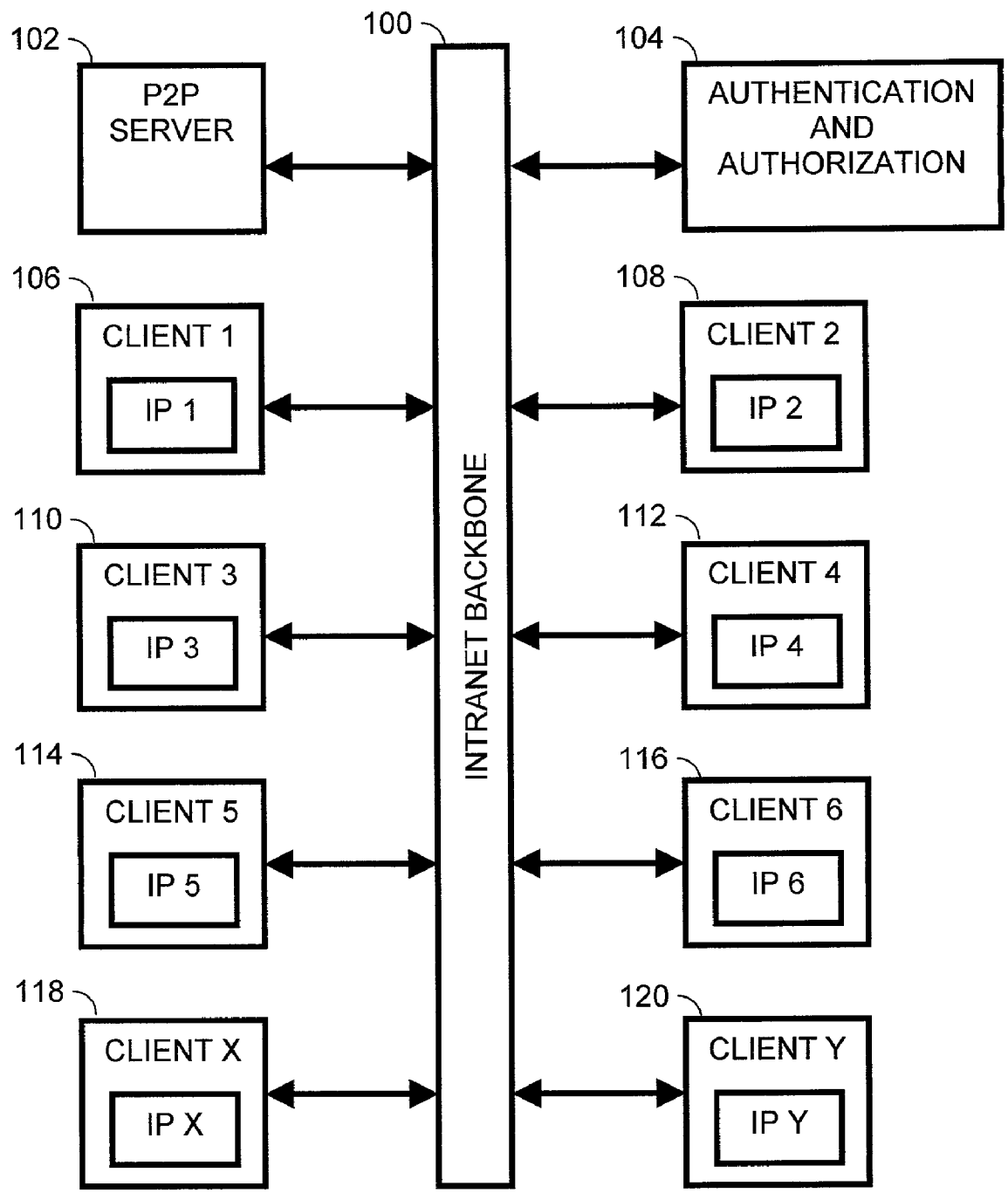
FIG. 1 shows a block diagram of a P2P network and system operating in accordance with a preferred embodiment of the present invention

FIG. 1 shows a block diagram of a P2P network and system operating in accordance with a preferred embodiment of the present invention. An intranet backbone 100 couples a P2P server 102 and an authentication and authorization process 104 to a multiplicity of clients 1–Y 106–120. Each client has a corresponding address indicative of the client as shown by IP 1 through IP Y. The intranet 100 also facilitates communication between the clients thereby enabling the P2P communications.

Figure 2:
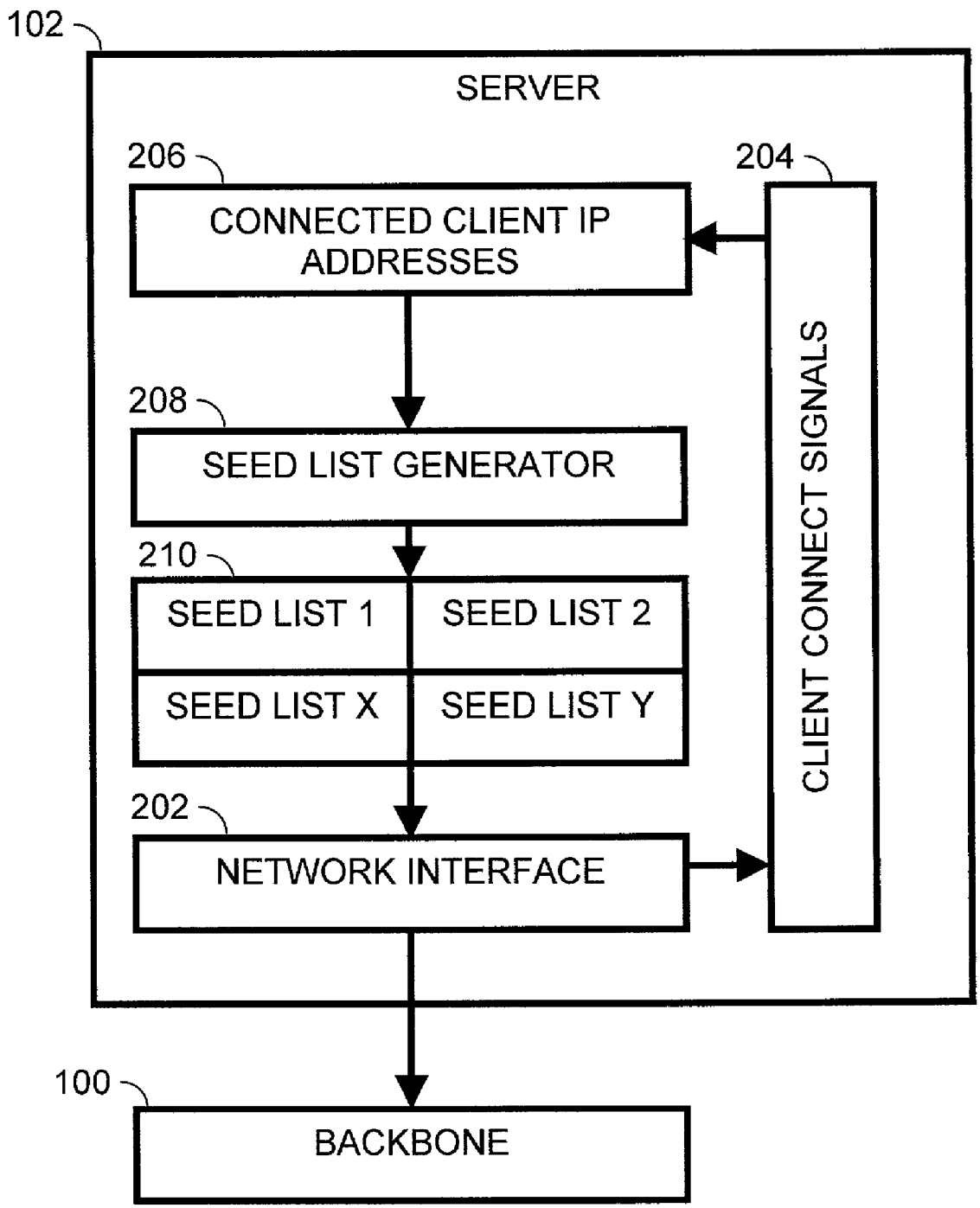
FIG. 2 shows a block diagram a server of the P2P network and system operating in accordance with a preferred embodiment of the present invention.

FIG. 2 shows a block diagram a server of the P2P network and system operating in accordance with a preferred embodiment of the present invention. Server 102 is coupled to intranet backbone 100 through a network interface 202 that facilitates communication with the intranet and the clients. When a client connects to the intranet, a client connect signal is received by the network interface 202 and process by the client connect function 204 which adds the address of the connected client to the connected client list 206. In response to the connect signal, seed list generator 208 generates a seed list for the connected client. The seed list being a member of a multiplicity of seed lists 210 that the server has provided to the clients. The seed list is shown being stored in a memory having all seed lists, in the preferred embodiment. The memory storage is optional. Seed lists may be randomly generated or generated in response to a number of criteria. Example criterion include geographic and client characterization. For example, seed lists may be limited to connected clients in a specific country or regions such as the United States or Europe. Alternatively seed lists may be limited to connected clients classes sharing a common attribute such as engineering or sales. Seed lists may also be generated in response to distance from client, distance including network response time, where clients that are close are included in the seed list. In another embodiment seed lists may be generated in response to prior seed lists in order to generate an optimal network interconnection in an effort to maximize searched clients within a search time. Such a method could be further used to create search islands within a P2P network. Server 102 also maintains the connected client IP addresses 206 by testing for an expected acknowledgement signal from the connected clients. If an acknowledgement signal is not received, then the client address is removed from the list. Preferably the server periodically send a PING signal to connected clients and if an acknowledgement PONG signal is not received within a predetermined time the server determines the client is disconnected and removes the address of the client from list 206.

Figure 3:
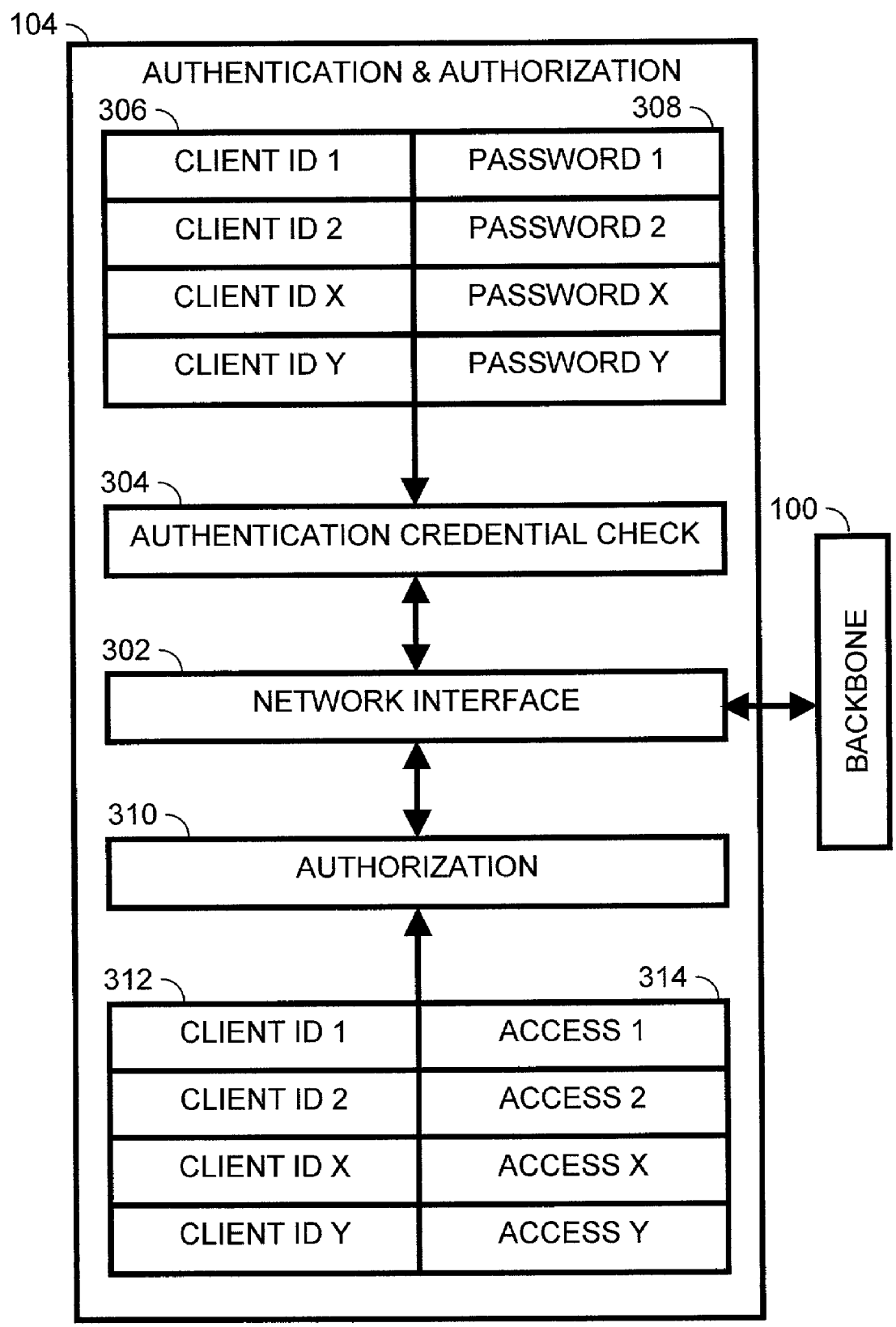
FIG. 3 shows a block diagram of an authentication and authorization process of the P2P network and system operating in accordance with a preferred embodiment of the present invention.

FIG. 3 shows a block diagram of an authentication and authorization process of the P2P network and system operating in accordance with a preferred embodiment of the present invention. Authentication and authorization process 104 preferably resides in a separate network security server but may alternatively reside in server 102. The authentication and authorization process is coupled to intranet backbone 100 through a network interface 302 that facilitates communication with the intranet and the clients. Before a client performs a resource search, the client may request that the authentication and authorization process provide authentication and/or authorization of the resource search.

If authentication is required, the client sends an authentication request signal to process 104. Network interface 302 receives the authentication request and communicates it to authentication credential check 304. The credentials are indicative of a client initiating a SEARCH request and included in the SEARCH request signal. When a client receives the SEARCH request and desires authentication of the requesting client, the credentials are communicated to process 104. The credentials preferably include a client ID of the client initiating the search and a corresponding password. Process 104 has a table of predetermined client identifications and passwords. If the client ID 306 and password 308 match those included in the authentication request signal, then the requesting client is verified and the process 104 sends an authentication signal back to the requesting client. Those familiar with the art appreciate that numerous other authentication processes are known and may be substituted for the authentication process described above.

If authorization is required, the client sends an authorization request signal to process 104. Network interface 302 receives the authorization request and communicates it to authorization process 310. The credentials are indicative of the client initiating the SEARCH request and included in the SEARCH request signal. When a client receives the SEARCH request and desires to determine which resources the requesting client is authorized to access, the credentials are communicated to process 104. The credentials preferably include a client ID of the client initiating the SEARCH. Process 104 has a table of predetermined client identifications 312 and access controls 314. In response to the authorization request, process 104 sends an authorization signal having the corresponding access control signals back to the requesting client. Access control signals 314 are indicative of the type of resources or client classes a client is permitted to search on its peers. Examples of various access controls or client classes include engineering resources, marketing resources and managerial resources. Each access control may have a number of subcategories, for example engineering may include network, integrated circuit and operating system subcategories. Each client may have authorization to access unique to each subcategory. For example, a client in an engineering department may not be authorized to search for managerial resources related to personnel issues or engineering integrated circuit resources while authorized to search engineering network and operating system resources.

In the preferred embodiment, both authentication and authorization processes are performed by a single request signal from the client, and may be performed for both SEARCH and GET requests. In alternative embodiments, only authorization or only authentication may be used. Furthermore, the authentications and/or authorizations may be held in the cache of a client in order to eliminate duplicate authentication and/or authorization communications of subsequent SEARCH and GET requests, thereby reducing network traffic.

Figure 4:
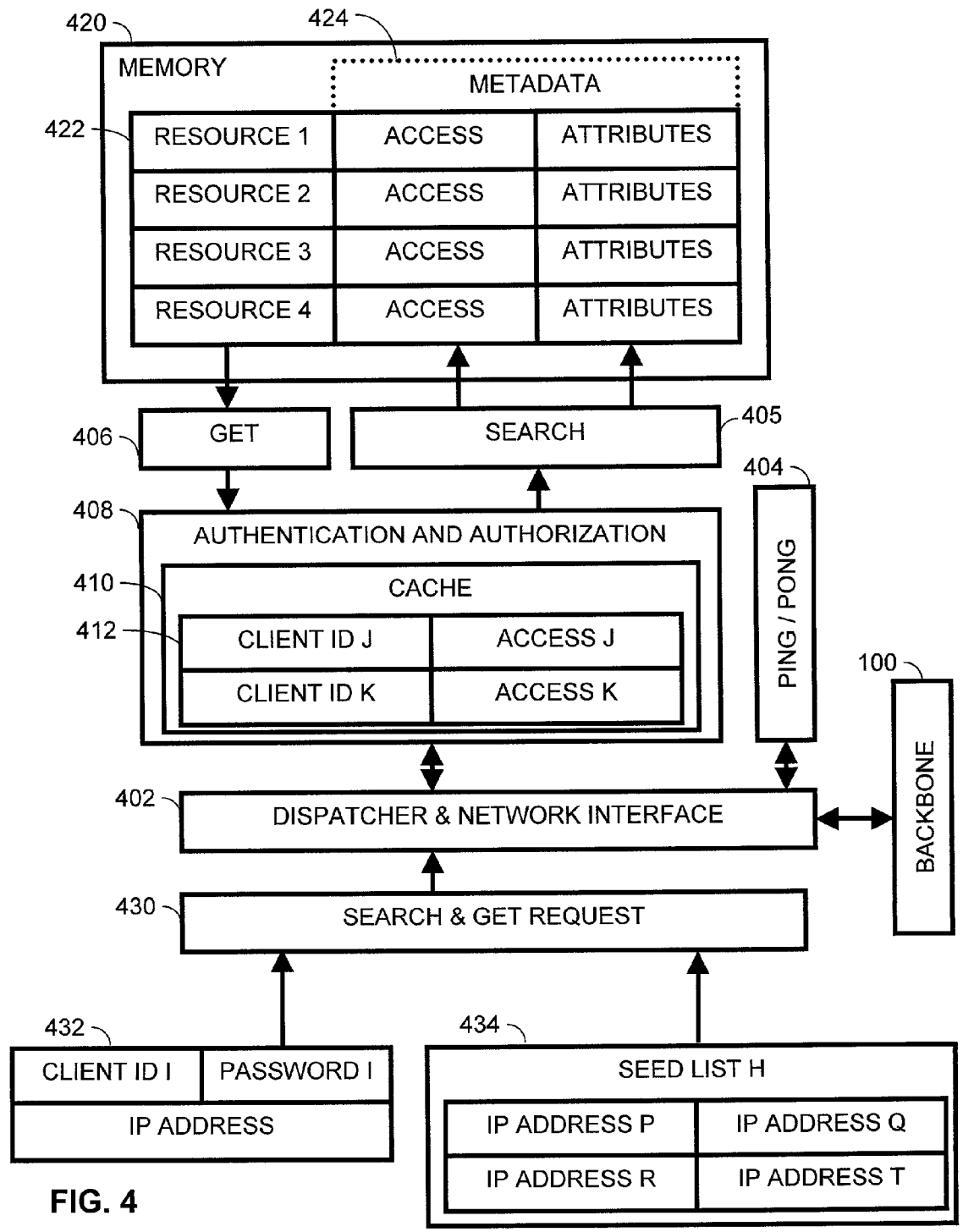
FIG. 4 shows a block diagram of a client of the P2P network and system operating in accordance with a preferred embodiment of the present invention.

FIG. 4 shows a block diagram of a client of the P2P network and system operating in accordance with a preferred embodiment of the present invention. The client is preferably a process operating in a personal computer coupled to intranet backbone 100. In alternate embodiments the process is operable in other computing devices such as laptop PCs, PDAs, and interactive consumer devices such as set top boxes, televisions, stereos, cell phones or other types of resource storing devices. Dispatcher and network interface 402 facilitates communication with the server, authentication and authorization process and other clients via the intranet backbone 100. The dispatcher responds to at least three signals received on the intranet backbone. The three signals are PING, SEARCH and GET. The client is also able to initiate PING, SEARCH and GET commands as well as communicate with the server 102 and authentication and authorization process 104. In responding to commands, the dispatcher 402 routs PING commands to ping/pong process 404 which responds to reception of a PING command with an acknowledging PONG command. SEARCH and GET commands are routed by dispatcher 402 to search and get processors 405 and 406. However, before a SEARCH or GET command is processed, the command is evaluated by the authentication and authorization process 408. Process 408 has at least three components, all of which are optional. The first component of authorization is predetermined and based upon the identification of the requesting client. This embodiment does not require the external authentication process 104. The second and third components are authentication and authorization performed by the external authentication and authorization 104. Numerous embodiments may be realized by various combinations of these three components. Authentication and authorization also includes an optional cache for storing authorized client identifications and or access controls associated with a client ID 412. Storage of this information in cache 410 reduces repeated authentication and/or authorization request to the process of FIG. 3.

If a SEARCH request is not authenticated, it need not be propagated to a subsequent peer in the P2P system, thereby reducing network traffic. Furthermore, the failure of the authentication need not be communicated to the requesting client, thereby deterring intranet hacking because the search requester will not know why the search yielded no results—either the resource was not found or the searcher not authenticated. If the SEARCH request is authenticated, then memory 320 of the client is searched for resource 422 matching the SEARCH request. Resources are preferably searched by searching metadata 424 which includes access controls and resource attributes. Search process 404 determines which resources may be searched by comparing the authorized access controls with the access controls associated with each resource. If there is a match, then the resource may be searched. Searching is preferably performed by searching attributes of the resource, the attributes including file type, file size, date or author. The attributes may also include comments or abstracts, for example manually generated by the author, providing additional information about the resource, thereby facilitating keyword searches. Alternatively, a more exhaustive search of the resource itself may be conducted. If a match is found, then a positive signal is propagated back to the client initiating the search.

A GET request is typically initiated by a client having initiated a SEARCH request and further having received a positive search result from the client receiving the GET request. The GET request may be both authorized and/or authenticated prior to execution by get process 406. Thereafter, the particular resource identified by the GET request is communicated to the requesting client.

Note that dispatcher 402 directly routs PING commands, however SEARCH and GET requests are in effect hidden behind a custom firewall 408. All requests, PING, SEARCH and GET appear to any other client as available. However, no response from the client may also mean there were security measures protecting GET or SEARCH. For example, a failed search does not send back a "no items found" signal. So if a client does not receive a response from a search, it does not know if the items were protected or if the items simply do not exist.

The client of FIG. 4 may also initiate SEARCH and GET requests. When a SEARCH request is initiated, the terms of the search are received typically from an operator of the client. The SEARCH and GET request processor 430 packages the terms of the search along with the credentials of the client 432 including a client ID and password as well as its IP address. The search request is then communicated to clients having an IP address included in its seed list 434, seed list 434 having IP addresses received from server 102. Credentials 432 are used in the aforementioned authentication and authorization processes. If a particular resource in a particular client is desired as a result of the search, then the SEARCH and GET request processor 430 packages the resource identification along with credential information into a GET request and sends the GET request to the corresponding client.

As a further part of the P2P search propagation process, a SEARCH request processed by search process 405 is also communicated to other addresses included in the seed list 434. This provides a peer-to-peer network search dispatcher for forwarding a resource search to client address of the seed list. However, the SEARCH request may not be propagated if there is a timeout or if there is a failure of the authentication process.

Figure 5:
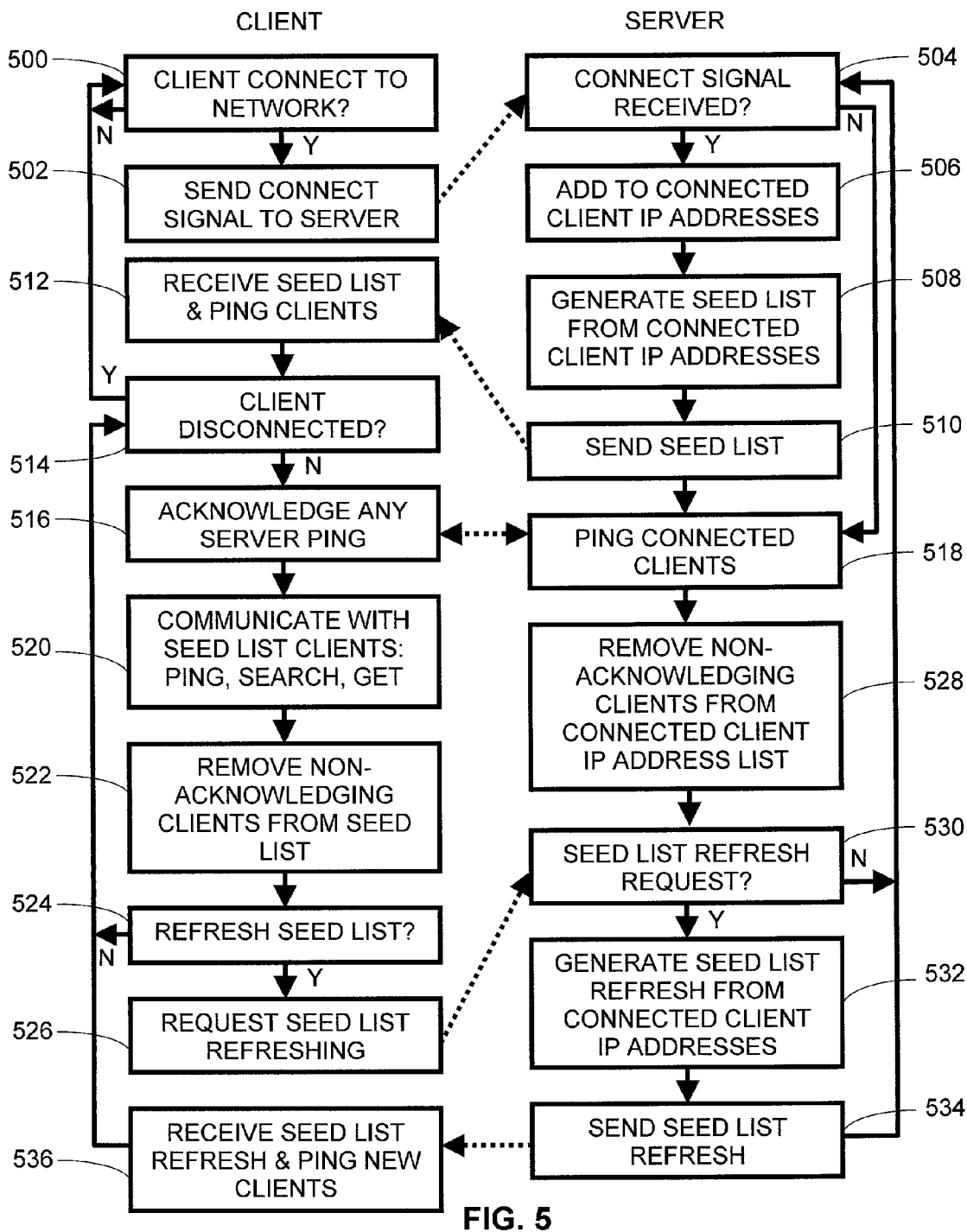
FIG. 5 shows a process flow diagram including interactions between a client and server for generating and maintaining seed lists in accordance with the a preferred embodiment of the present invention.

FIG. 5 shows a process flow diagram including interactions between a client and server for generating and maintaining seed lists in accordance with the a preferred embodiment of the present invention. For clarity, processes performed within the client are on the left and processes performed within the server are on the right. Beginning at step 500, the client stays at step 500 until it connects to the network. Connection preferably involves executing a program facilitating coupling to the P2P network. Such a program may be executed in a desktop personal computer client after it is powered ON. Similarly, such a program may be executed in a portable laptop personal computer client after it is physically coupled to the backbone.

Thereafter, the client sends a connect signal including the address of the client to the server at step 502. The server receives the connect signal at step 504 and adds the client address to the connected client address list, step 506. Step 508 generates a seed list for the client using any method including the aforementioned seed list generation methods. The seed list is sent from the server at step 510 and received by the client at step 512. Step 512 further sends a PING signal to the clients on the seed list to verify their connection to the P2P network. Non-acknowledging clients will be removed from the seed list at step 522. If the client has been disconnected at step 514, the process returns to step 500 awaiting reconnection. Disconnection can result at any time and be the result of a number of different events such as the client being powered OFF or the operator terminating the client's P2P program. It is not necessary for the client to actively signal the server that it is disconnected from the network. If still connected the client acknowledges any PING signal received as step 516. PING signals may be received from the server or other clients and are typically acknowledged with a PONG signal. Step 520 communicates with other clients performing PING, SEARCH and GET requests. If a client on the seed list does not respond to a PING, SEARCH or GET request, or may not otherwise be coupled or bound to, the client is determined to have been disconnected from the network and is removed from the seed list at step 522. Step 524 determines if the seed list should be refreshed, and if so sends the server a request to refresh the seed list at step 526. The seed list may be refreshed for any of several reasons including removal of one or more clients at step 522. Alternatively the seed list can be refreshed in response to a specific input from the operator, initiation of a new search, or after a certain period of time or inactivity. In other embodiments the server may initiate a refresh in order to reconfigure network behaviors. Seed list refresh may be a total or partial refresh. For example, if a seed list initially contained ten clients and it was determined that four of the clients had disconnected then the seed list refresh could request four new client addresses. Alternatively, if a first initiated search was based in engineering resources and a second initiated search was based in sales resources, an entire seed list could be replaced accordingly to optimize searching for a different type of resource. At the server, step 528 maintains the connected client address list. This is done by periodically sending a PING signal from the server to the clients on the connected list. If an expected acknowledgement signal, such as a PONG signal, is not received, then the client is removed from the connected client list. Then step 530 determines if the server has received a seed list refresh request and if not returns to step 504. Otherwise the server generates a seed list refresh from the connected client IP address list at step 532 and sends the seed list to the requesting client at step 534. The client receives the refreshed seed list at step 536 and sends a PING signal to new clients. Any non-acknowledging new clients are removed from the seed list at step 522. By the process of FIG. 5, seed lists are established and maintained at the client and the connected client IP address list is maintained at the server. It should be appreciated that in alternate embodiments the server may remove a client from the connected lists in response to any non-acknowledgement including non-response to a PING signal. For example clients could periodically send an acknowledgement signal without requiring PING from the server and if the acknowledgement signal is not received within a predetermined time, then step 528 removes the client from the connected list. Alternatively the client could actively send a disconnect signal, conditions permitting, and the server remove the client from the connected list in response thereto. Note in the preferred embodiment clients on the seed list are not regularly sent PING requests because the PING requests of steps 512 and 536 are sufficient. This has the advantage of significantly reducing network traffic in a distributed search P2P network.

Figure 6:
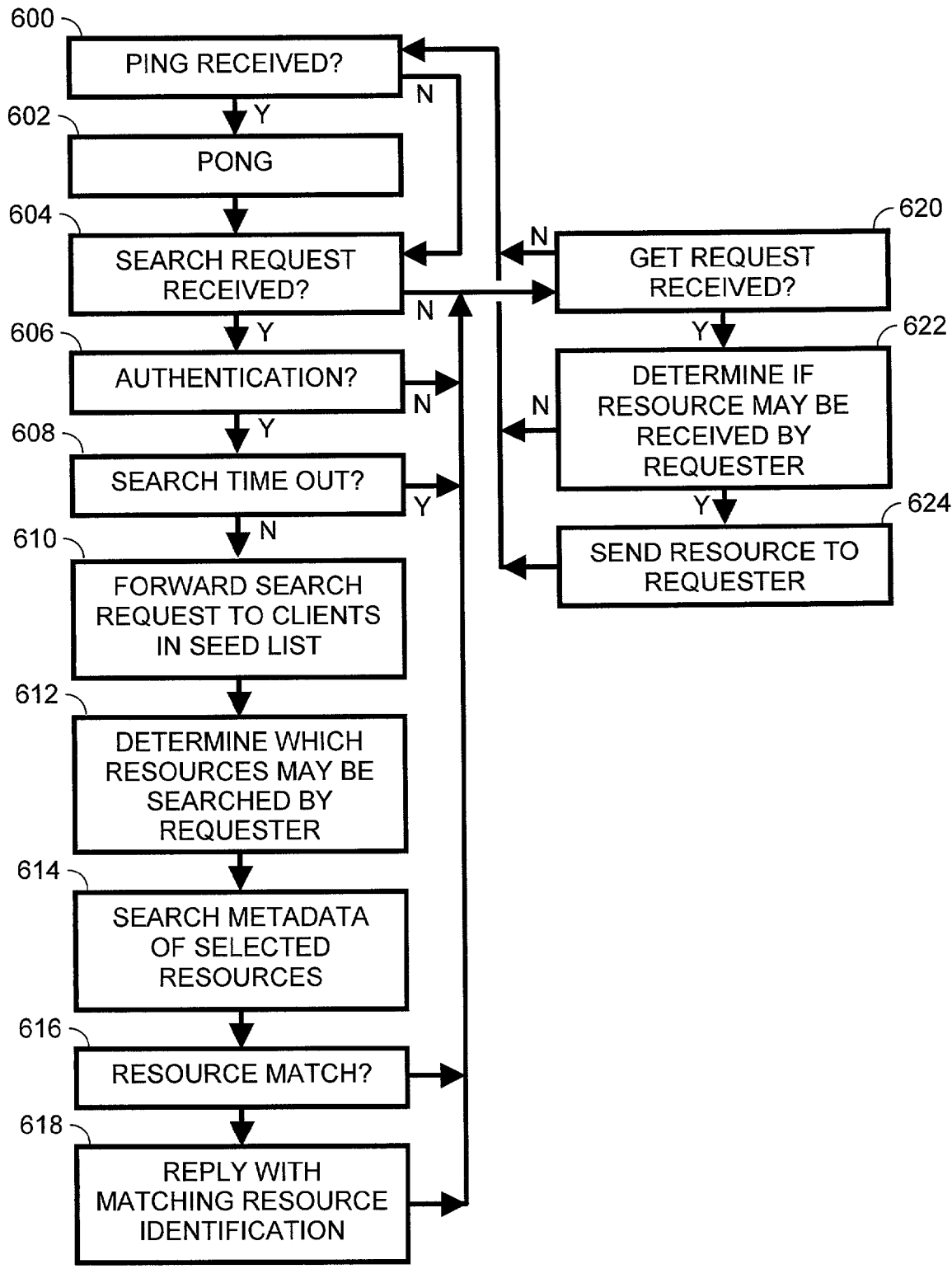
FIG. 6 shows a process flow diagram of PING, SEARCH and GET request processing by a client in accordance with a preferred embodiment of the present invention.

FIG. 6 shows a process flow diagram of PING, SEARCH and GET request processing by a client in accordance with a preferred embodiment of the present invention. If a PING is received by a client at step 600 then a PONG is sent by the client at step 602. If a SEARCH request is received at step 604 then authentication is performed at step 606 and a search time out is checked at step 608. Authentication will be described in more detail below. If authentication passes and the search has not timed out, then step 610 forwards the search request to other clients in the seed list. Step 612 determines which resources may be searched by the client requesting or initiating the search. Of the selected or authorized resources, step 614 searches resource metadata for a match with the search request. If there is a resource match at step 616 then the client replies with a signal indicative of the matching resource at step 608 for propagation back to the requesting computer. From either of steps 604, 606, 608, 616 or 618 the process proceeds to step 620 to determine if a GET request is received. A GET request is typically initiated by a client after initiating a SEARCH request and receiving a match signal generated at step 618. If a GET request is received then step 622 determines if the requesting client is authorized to receive the resource. If authorized, step 624 sends the resource to the client initiating the GET request. It should be appreciated that the search is not propagated in response to a time out at step 608 or in response to an authentication failure at step 606. It should further be appreciated by one familiar with the art that the authentication process of step 606 may be combined with the determination process of step 612 while inhibiting search propagation in response to failure of authentication.

Figure 7:
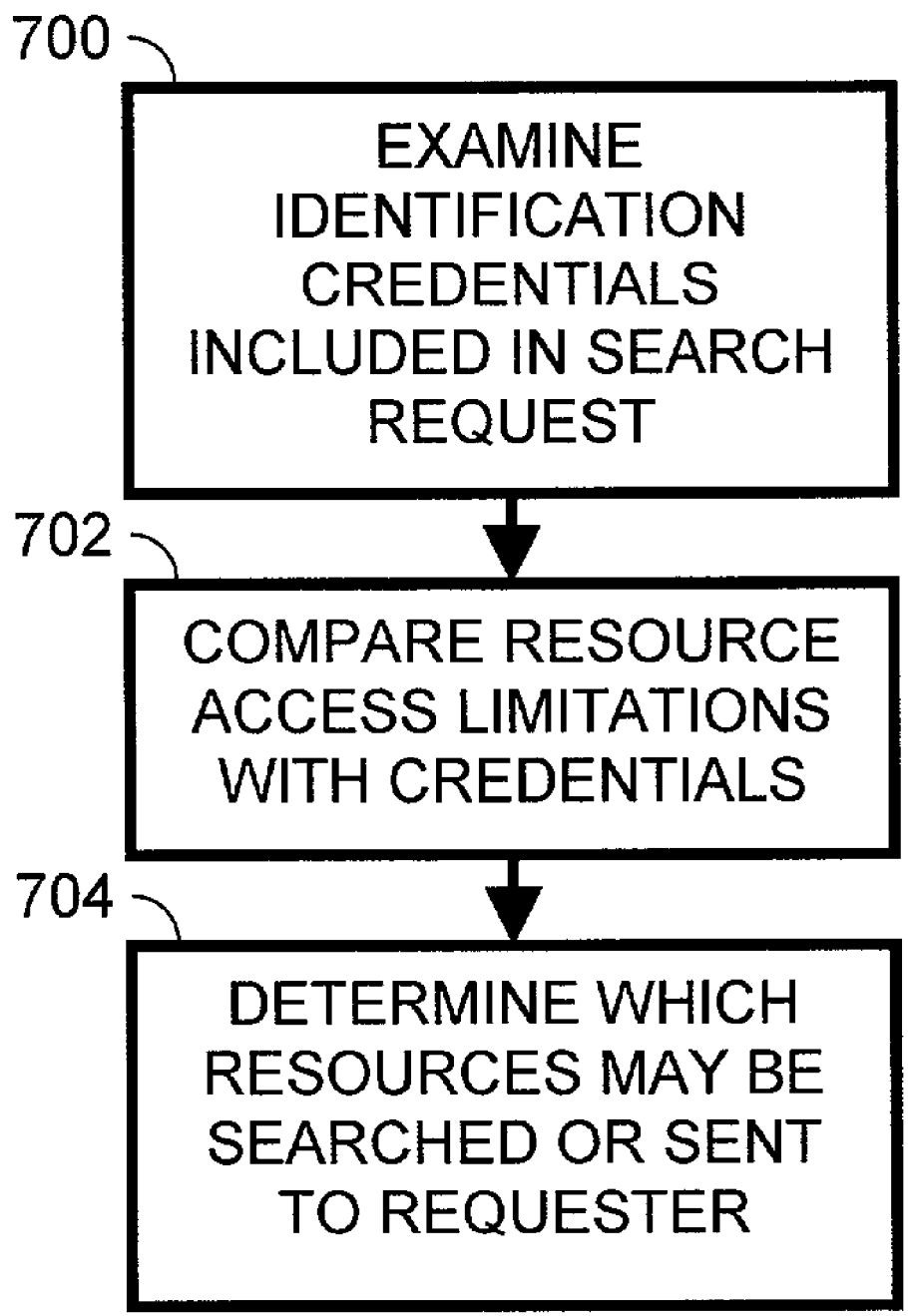
FIG. 7 shows a process flow diagram of an authentication process that does not require communication with an authentication process external to the client.

FIG. 7 shows a process flow diagram of an authentication process that does not require communication with an authentication process external to the client. The process of FIG. 7 occurs at the client at steps 612 and 622 of FIG. 6. At step 700 the identification credentials of the client initiating the search request are checked. The credential check could be a simple comparison of the client ID with a predetermined list, determination of the IP address of the requesting client, verification of a check sum, an encryption technique, security certificate or other method that does not require authentication through a process external to the client in response to a SEARCH or GET request. At step 702, resource access limitations are compared with the credentials of the initiating client. For example, it may be predetermined that client 1 has access to resources 2 and 3 while client 2 has access to resources 5 and 6. Alternatively it may be predetermined that clients from a certain IP gateway have limited access while other clients have unlimited access to resources. In response step 704 determines which specific resources may be searched or sent to the requesting client. The process shown in FIG. 7 has the advantage of providing for selective resource sharing in a distributed P2P network without the requirement of an external authorization and/or authentication process, the selection being in response to credentials indicative of the requesting client.

Figure 8:
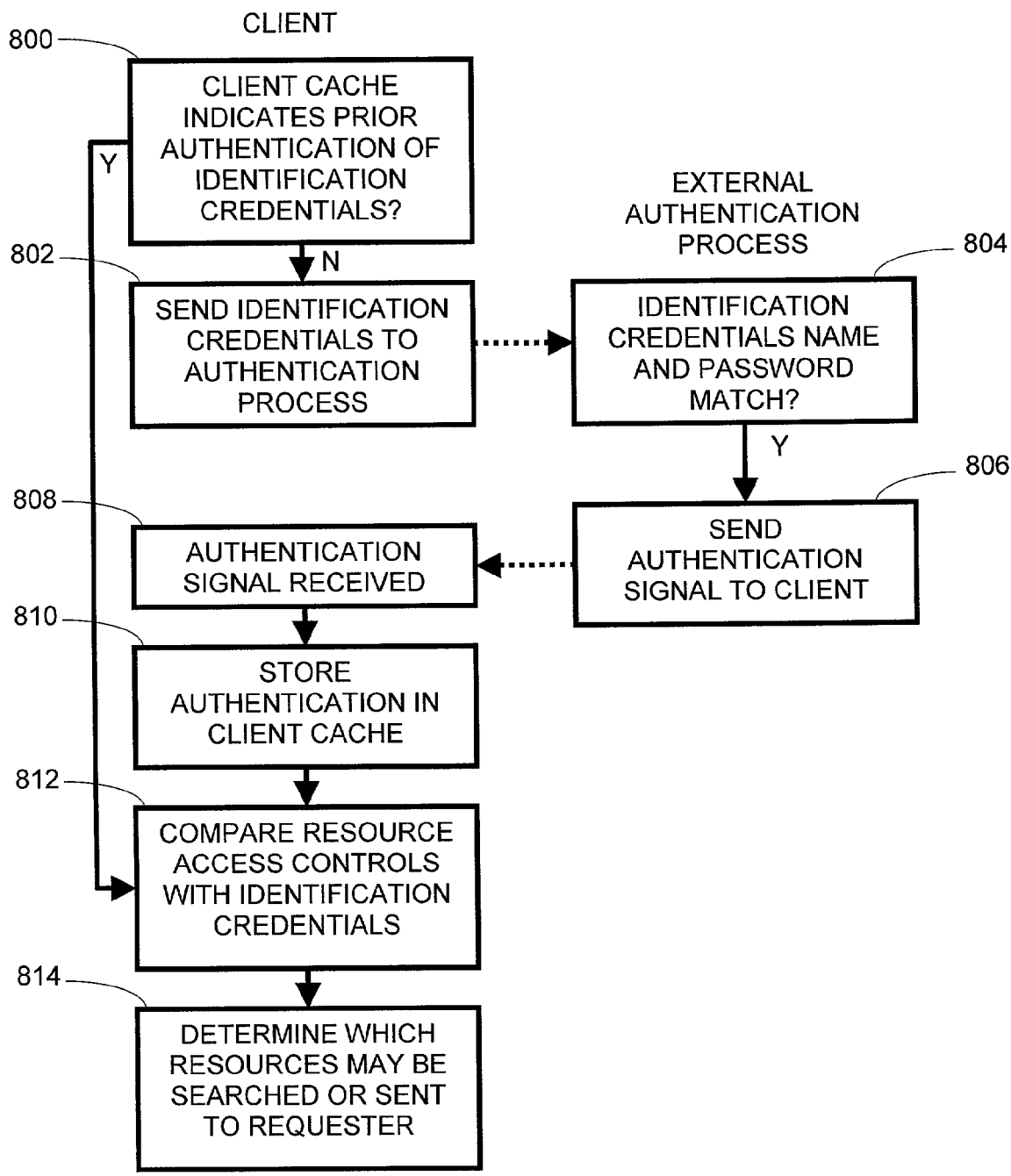
FIG. 8 shows a process flow diagram of communication between a client and an authentication process external to the client in accordance with a preferred embodiment of the present invention.

FIG. 8 shows a process flow diagram of communication between a client and an authentication process external to the client in accordance with a preferred embodiment of the present invention. For clarity, the client processes occur on the left side of FIG. 8 and the external authentication processes occur on right side of FIG. 8. The processes of FIG. 8 provide more detail to the processes shown in steps 612 or 622 of FIG. 6. Step 800 examines the client cache for a prior authentication of identification credentials performed in a prior SEARCH or GET request. If no prior authentication, then step 802 sends the identification credentials to an external authentication process, such as process 104 of FIG. 1. The external authentication process receives the credentials at step 804 and determines if the name and password included in the credentials matches a name and password stored at the authentication process. If there is a match, the authentication signal is returned to the client at step 806. Otherwise authentication is denied. The authentication signal is received by the client at step 808 and stored in the client cache along with the credentials received in the SEARCH or GET request at step 810. Thereafter, resource access controls are compared with identification credentials at step 812. For example it may be predetermined that client 1 has access to resources 2 and 3 while client 2 has access to resources 5 and 6. Alternatively it may be predetermined that clients from a certain IP gateway have limited access while other clients have unlimited access to resources. Step 814 determines which resources may be searched or sent to the requesting client. The process shown in FIG. 8 has the advantage of providing for selective resource sharing in a distributed P2P network using a centrally controlled authentication process. In a large organization where employees routinely are hired or terminated, central control of authentication allows for secure control of who may conduct a search in a distributed search P2P network system. Furthermore, caching of prior authentications significantly reduces authentication network traffic.

Figure 9:
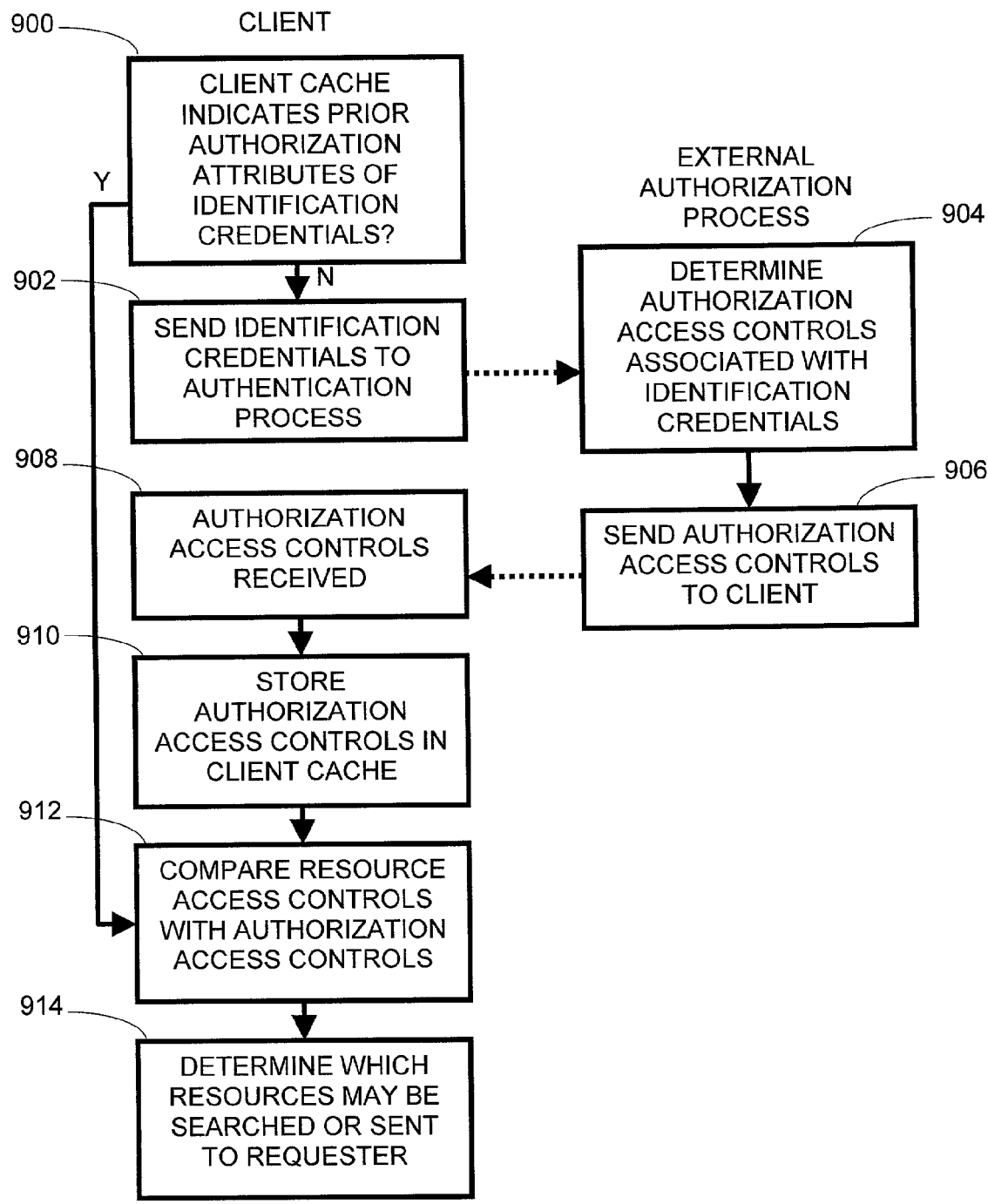
FIG. 9 shows a process flow diagram of a communication between a client and an authorization process external to the client in accordance with a preferred embodiment of the present invention.

FIG. 9 shows a process flow diagram of a communication between a client and an authorization process external to the client in accordance with a preferred embodiment of the present invention. For clarity, the client processes occur on the left side of FIG. 9 and the external authorization processes occur on right side of FIG. 9. The processes of FIG. 9 provide more detail to the processes shown in steps 612 or 622 of FIG. 6. Step 900 examines the client cache for prior authorization access limitations of identification credentials performed in a prior SEARCH or GET request. If no prior authorization, then step 902 sends the identification credentials to an external authorization process, such as process 104 of FIG. 1. The external authorization process receives the credentials at step 904 and determines which access controls are associated with the identification credentials. In response an authorization access control signal is returned to the client at step 906. The authorization access control signal is received by the client at step 908 and stored in the client cache along with the credentials received in the SEARCH or GET request at step 910. Thereafter, authorization access controls associated with the requesting client are compared with resource access controls at step 912. Step 914 determines which resources may be searched or sent to the requesting client. The process shown in FIG. 9 has the advantage of providing for selective resource sharing in a distributed P2P network using a centrally controlled authorization process. In a large organization where employees regularly change job functions, thereby requiring access to differing types of information, central control of authorization allows for secure control of the type of resource one may search in a distributed search P2P network system. Furthermore, caching of prior authorizations significantly reduces authorization network traffic.

Thus, what is provided is a system that adapts the advantages of the P2P network while resolving disadvantages of current P2P systems. The P2P network takes advantage of the reduced central server requirements of a pure P2P network without sacrificing the efficiencies of the central server. Furthermore, the P2P network provides secure access and control to client resources without the requirement of a central server. The server function and security functions can operate independently. For example, the P2P network of FIG. 1 may be operated without the authentication and authorization functions 104 to provide server enhanced P2P search propagation. Alternately, the P2P network of FIG. 1 may be operated without the P2P server 102 providing a P2P search propagation with authentication and/or authorization functionality. The server 102 and authentication and authorization 104, when combined produce an efficient and secure P2P search propagation network. Such a combined system finds advantageous application in intranet application for global or other large organizations.

The present invention, as would be known to one familiar with the art, could be produced in hardware or software, or in a combination of hardware and software. The system, or method, according to the inventive principles as disclosed in connection with the preferred embodiment, may be produced in a single computer system having separate elements for performing the individual functions or steps described or claimed or one or more elements combining the performance of any of the functions or steps disclosed or claimed, or may be arranged in a distributed computer system, interconnected by any suitable means as would be known by one familiar with the art.

According to the inventive principles as disclosed in connection with the preferred embodiment, the invention and the inventive principles are not limited to any particular kind of computer system but may be used with any general purpose computer, as would be known to one familiar with the art, arranged to perform the functions described and the method steps described. The operations of such a computer, as described above, may be according to a computer program contained on a medium for use in the operation or control of the computer, as would be known to one familiar with the art. The computer medium that may be used to hold or contain the computer program product, may be a fixture of the computer such as an embedded memory or may be on a transportable medium such as a disk, as would be known to one familiar with the art.

The invention is not limited to any particular computer program or logic or language, or instruction but may be practiced with any such suitable program, logic or language, or instructions as would be known to one familiar with the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although a specific embodiment of the invention has been disclosed. It will be understood by those familiar with the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. In a peer-to-peer network a method of securely conducting a resource search initiated by a first client, the resource search included with a search request having a credentials signal indicative of the first client, the method comprising the steps of:

communicating the search request from the first client to a second client, the second client having a multiplicity of second resources, each of the multiplicity of second resources having at least one corresponding access attribute;

at the second client, selectively searching the multiplicity of second resources in response to comparison of the authentication and authorization data within the credentials signal and the at least one access attribute of each of the multiplicity of second resources;

communicating the search request from the second client to a third client, the third client having a multiplicity of third resources, each of the multiplicity of third resources having at least one corresponding access attribute; and at the third client, selectively searching the multiplicity of third resources in response to comparison of the credentials signal and the at least one access attribute of each of the multiplicity of third resources, wherein the credentials signal includes an identification signal indicative of the first client, the access attributes of the second and third resources includes an authorization signal indicative of at least one of a plurality of clients, the plurality of clients including the first client, said step of selectively searching the second multiplicity of resources further includes the steps of:
  communicating from the second client to an authentication process external to the first, second and third clients the identification signal;
  receiving from the authentication process an authenticated signal indicative of the first client in response thereto; and
  searching one of the second multiplicity of resources if the authenticated signal substantially matches the authorization signal included with the corresponding access attributes, and said step of selectively searching the third multiplicity of resources further includes the steps of:
  communicating from the third client to the authorization process the identification signal;
  receiving from the authorization process the authenticated signal indicative of the first client in response thereto; and
  searching one of the third multiplicity of resources if the authenticated signal substantially matches the authorization signal included with the corresponding access attributes.

2. The method according to claim 1 further comprising the steps:
  at the second client, storing the identification signal and the received authenticated signal in a cache memory at the second client; and
  at the second client searching the cache memory for the identification signal and the received authentication signal prior to said step communicating from the second client to the authentication process, wherein
  said step communicating from the second client to the authentication process is not performed if said step of searching the cache memory finds the identification signal and the received authentication signal stored therein, and
  said step of searching one of the second multiplicity of resources uses the authenticated signal stored in the cache memory, thereby reducing communication between the second client and the authentication process.

3. The method according to claim 1 further comprising the steps:
  at the third client, storing the identification signal and the received authenticated signal in a cache memory at the third client; and
  at the third client searching the cache memory for the identification signal and the received authentication signal prior to said step communicating from the third client to the authentication process, wherein
  said step communicating from the third client to the authentication process is not performed if said step of searching the cache memory finds the identification signal and the received authentication signal stored therein, and
  said step of searching one of the third multiplicity of resources uses the authenticated signal stored in the cache memory, thereby reducing communication between the third client and the authentication process.

4. The method according to claim 1 wherein said step of communicating the search request from the second client to the third client and said step of selectively searching the multiplicity of third resources are not performed if the authentication signal is not received from the authentication process by the second client.

5. In a peer-to-peer network a method of securely conducting a resource search initiated by a first client, the resource search included with a search request having a credentials signal indicative of the first client, the method comprising the steps of:
  communicating the search request from the first client to a second client, the second client having a multiplicity of second resources, each of the multiplicity of second resources having at least one corresponding access attribute;
  at the second client, selectively searching the multiplicity of second resources in response to a comparison of authentication and authorization data within the credentials signal and the at least one access attribute of each of the multiplicity of second resources;
  communicating the search request from the second client to a third client, the third client having a multiplicity of third resources, each of the multiplicity of third resources having at least one corresponding access attribute; and
  at the third client, selectively searching the multiplicity of third resources in response to comparison of the credentials signal and the at least one access attribute of each of the multiplicity of third resources,
  wherein the credentials signal includes an identification signal indicative of the first client,
  the access attributes of the second and third resources includes an authorization signal indicative of at least one of a plurality of client classes,
  said step of selectively searching the second multiplicity of resources further includes the steps of:
    communicating from the second client to an authorization process external to the second client the identification signal;
    receiving from the authorization process a client class signal indicative which of the plurality of client classes are associated with the identification signal; and
    searching one of the second multiplicity of resources if the client class signal substantially matches the authorization signal included with the corresponding access attributes, and
  said step of selectively searching the third multiplicity of resources further includes the steps of:
    communicating from the third client to the authorization process external to the third client the identification signal;

receiving from the authorization process the client class signal indicative which of the plurality of client classes are associated with the identification signal; and searching one of the third multiplicity of resources if client class signal substantially matches the authorization signal included with the corresponding access attributes.

6. The method according to claim 5 further comprising the steps:

at the second client, storing the identification signal and the received client class signal in a cache memory at the second client; and at the second client searching the cache memory for the identification signal and the received client cache signal prior to said step communicating from the second client to the authorization process, wherein said step communicating from the second client to the authorization process is not performed if said step of searching the cache memory finds the identification signal and the received client cache signal stored therein, and said step of searching one of the second multiplicity of resources uses the client cache signal stored in the cache memory, thereby reducing communication between the second client and the authorization process.

7. The method according to claim 5 further comprising the steps:

at the third client, storing the identification signal and the received client class signal in a cache memory at the third client; and at the third client searching the cache memory for the identification signal and the received client cache signal prior to said step communicating from the third client to the authorization process, wherein said step communicating from the third client to the authorization process is not performed if said step of searching the cache memory finds the identification signal and the received client class signal stored therein, and said step of searching one of the third multiplicity of resources uses the client class signal stored in the cache memory, thereby reducing communication between the third client and the authentication process.

8. In a peer-to-peer network a method of securely conducting a resource search initiated by a first client, the resource search included with a search request having a credentials signal indicative of the first client, the method comprising the steps of:

communicating the search request from the first client to a second client, the second client having a multiplicity of second resources, each of the multiplicity of second resources having at least one corresponding access attribute;

at the second client, selectively searching the multiplicity of second resources in response to a comparison of authentication and authorization data within the credentials signal and the at least one access attribute of each of the multiplicity of second resources;

communicating the search request from the second client to a third client, the third client having a multiplicity of third resources, each of the multiplicity of third resources having at least one corresponding access attribute; and at the third client, selectively searching the multiplicity of third resources in response to comparison of the credentials signal and the at least one access attribute of each of the multiplicity of third resources, wherein the peer-to-peer network further includes a multiplicity of clients including the first, second and third clients, each of the multiplicity of clients having a unique client address, and a server having a list of client addresses, said method further comprising the steps of:

communicating from the server to the first client a first seed list comprising a first portion of the list of client addresses; and communicating from the server to the second client a second seed list comprising a second portion of the list of client addresses, the first seed list including a second client address corresponding to the second client and the second seed list including a third client address corresponding to the third client, said step of communicating the search request from the first client to the second client communicates to the second client in response to the second client address included in the first seed list, and said step of communicating the search request from the second client to the third client communicates to the third client in response to the third client address included in the second seed list.

9. The method according to claim 8 wherein each of the multiplicity of clients may be either connect to or disconnect from the peer-to-peer network at any time, and the method further comprising the steps of:

at the server, determining which of the multiplicity of clients is connected to the peer-to-peer network;

at the server, generating a list of connected client addresses in response said step of determining; and at the server, generating the first and second seed lists from the list of connected client addresses.

10. The method according to claim 9 further comprising the steps of:

communicating a connection signal from one of the multiplicity of clients to the server in response to the one of the multiplicity of clients connecting to the peer-to-peer network; and at the server, adding a newly connected client address corresponding to the one of the multiplicity of clients to the list of connected client addresses in response thereto.

11. In a peer-to-peer network a method of securely conducting a resource search initiated by a first client, the resource search included with a search request having a credentials signal indicative of the first client, the method comprising the steps of:

communicating the search request from the first client to a second client;

communicating the search request from the second client to a third client, the third client having a multiplicity of third resources, each of the multiplicity of third resources having at least one corresponding access attribute; and at the third client, selectively searching the multiplicity of third resources in response to a comparison of authentication and authorization data within the credentials signal and the at least one access attribute of each of the multiplicity of third resources, wherein the peer-to-peer network further includes a multiplicity of clients including the first, second and third clients, each of the multiplicity of clients having a unique client address, and a server having a list of client addresses, said method further comprising the steps of:

communicating from the server to the first client a first seed list comprising a first portion of the list of client addresses; and communicating from the server to the second client a second seed list comprising a second portion of the list of client addresses, the first seed list including a second client address corresponding to the second client and the second seed list including a third client address corresponding to the third client, said step of communicating the search request from the first client to the second client communicates to the second client in response to the second client address included in the first seed list, and said step of communicating the search request from the second client to the third client communicates to the third client in response to the third client address included in the second seed list.

* * * * *